June 28, 1960 E. J. JACOBSON ET AL 2,943,257
CONSTANT-FREQUENCY ALTERNATING-CURRENT ELECTRICAL SYSTEMS
Filed July 16, 1959 2 Sheets-Sheet 2

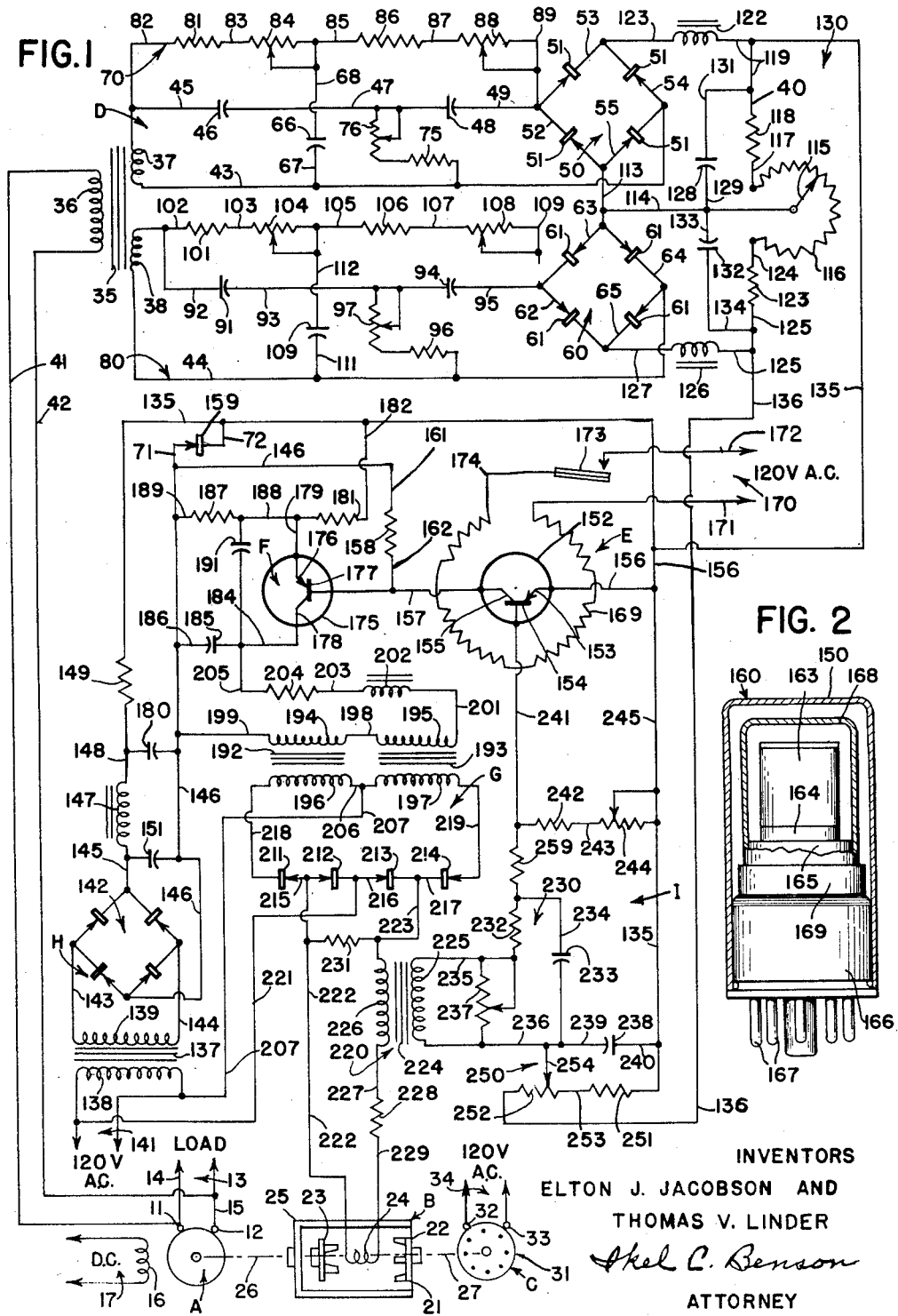

INVENTORS
ELTON J. JACOBSON AND
THOMAS V. LINDER
BY
*Akel C. Benson*
ATTORNEY 2,943,257

CONSTANT-FREQUENCY ALTERNATING-CURRENT ELECTRICAL SYSTEMS

Elton J. Jacobson, Hopkins, Minn., and Thomas V. Linder, Memphis, Tenn., assignors to Electric Machinery Mfg. Company, Minneapolis, Minn., a corporation of Minnesota Filed July 16, 1959, Ser. No. 827,537

7 Claims. (Cl. 322—29)

The herein disclosed invention relates to constant-frequency alternating-current electrical systems and has for an object to provide a system in which the frequency is maintained to an accuracy of one-tenth of one percent or less of the desired frequency.

Another object of the invention resides in providing a system in which the frequency is continuously maintained constant.

A still further object of the invention resides in providing a system adaptable for use with any type of alternating-current generator.

An object of the invention resides in providing a control circuit for the system utilizing a transistor and in placing the transistor in a temperature controlled oven and in operating said transistor at a temperature such that the input voltage is practically zero at the desired frequency.

Another object of the invention resides in providing a sensing device connected to the control circuit and consisting of two tuned circuits producing direct currents of opposite polarity. These currents are superimposed to produce a direct-current output voltage of substantially zero potential at the desired frequency and varying in accordance with the departure of the frequency from the desired frequency.

A still further object of the invention resides in providing amplifying means for the control circuit including a magnetic amplifier.

Another object of the invention resides in providing an electro-magnetic slip coupling for driving the generator and controlled by the voltage derived from the amplifier, and an electric motor serving as a prime mover for driving the slip coupling.

Other objects of the invention reside in the novel combination and arrangement of parts and in the details of construction hereinafter illustrated and/or described.

In the drawings:

Fig. 1 is a wiring diagram of the invention.

Fig. 2 is an elevational longitudinal sectional view of the oven and contents.

Figure 3:
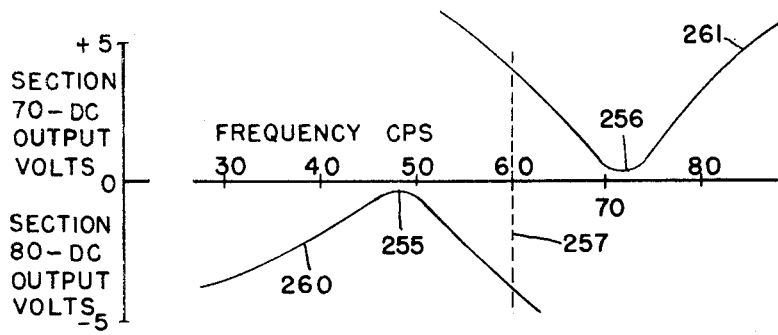
Fig. 3 is a diagrammatic view of curves designating the individual outputs of the two voltage producing circuits of the sensing device.

The invention includes an alternating-current generator A which is driven by an electro-magnetic slip coupling B from a prime mover C. The output of the generator A is fed to a sensing device D which produces a voltage depending upon variation in frequency from a desired frequency. This voltage is fed to a control circuit E which in turn is amplified by a transistor amplifier F, the output of which is further amplified by a magnetic amplifier G and which operates the slip coupling B and varies the speed of the generator A to maintain the frequency constant. A power supply H furnishes regulated voltage for energizing the control circuit and amplifiers and a stabilizing system I is employed to prevent hunting. These various parts will now be described in detail.

The generator A may be a single phase alternating current generator of conventional construction having output terminals 11 and 12 connected to a line 13 having conductors 14 and 15. The load for which the frequency regulating current is desired is connected to the line 13 and has not been shown in the drawings. The generator A consists of a rotor not specifically illustrated and which is connected to the terminals 11 and 12 and a field winding 16 which is connected to a line 17 leading from a suitable source of direct current for exciting the field winding.

The slip coupling B may be of conventional construction and consists of a rotor 21 comprising two magnetic field structures 22 and 23 which, when brought together, provide alternating poles magnetically excited by means of a field winding 24. The said slip coupling further includes a ring member or drum 25 which encircles the field structures 22 and 23 and in which eddy currents are induced by rotation of said field structures. The drum 25 is connected by means of a shaft 26 to the rotor of the generator A while the rotor 21 of the slip coupling has connected to it a shaft 27.

The prime mover C may consist of any source of power and in the particular illustration an induction type electric motor has been shown having a rotor 31 which is connected to the shaft 27 and drives the same. The motor C has terminals 32 and 33 which are connected to a suitable source of electrical energy for driving said motor.

The sensing device D includes a power transformer 35 having a primary winding 36 and two secondary windings 37 and 38. The primary winding 36 is connected by means of conductors 41 and 42 to the conductors 14 and 15 of line 13.

The sensing device D further includes two circuits 70 and 80 producing direct currents of opposite polarity. The voltages from these circuits are superimposed or combined in an output circuit 40 of the device to produce a single output voltage. The circuit 170 includes a rectifier 50 which consists of a number of diodes 51 connected in bridge formation by means of conductors 52, 53, 54 and 55. One end of the secondary winding 37 of transformer 35 is connected by means of a conductor 43 to the conductor 54 of rectifier 50. Similarly, one end of secondary winding 38 of said transformer is connected by means of a conductor 44 to the conductor 64 of rectifier 60. The other end of the secondary winding 37 is connected by means of a conductor 45 to a condenser 46 which in turn is connected by means of a conductor 47 to another condenser 48. This condenser in turn is connected by means of a conductor 49 to the conductor 52 of the rectifier 50. One end of a fixed resistor 75 is connected to the conductor 43 and the other end of said resistor is connected to one end of an adjustable resistor 76. The other end of this resistor is connected to the conductor 47. One end of a fixed resistor 81 is connected by means of a conductor 82 to the conductor 45 and thus to secondary winding 37 while the other end of this resistor is connected by means of a conductor 83 to an adjustable resistor 84. The other end of resistor 84 is connected by means of a conductor 85 to another fixed resistor 86 which in turn is connected by means of a conductor 87 to an adjustable resistor 88. This resistor in turn is connected by means of a conductor 89 to the conductor 49 and thus to the conductor 52 of rectifier 50. A condenser 66 is connected by means of a conductor 67 to the conductor 43 and by means of a conductor 68 to the conductor 85.

The circuit 80 includes a rectifier 60 which is similarly provided with four diodes 61 connected in bridge formation by means of conductors 62, 63, 64 and 65. One end of the secondary winding 38 of transformer 35 is connected by means of a conductor 44 to the conductor 64 of rectifier 60. A condenser 91 is connected by means of a conductor 92 to the other end of the secondary 38 and is further connected by means of a conductor 93 to another condenser 94. This condenser in turn is connected by means of a conductor 95 to the conductor 62 of the rectifier 60. A fixed resistor 96 is connected to conductor 44 and to an adjustable resistor 97. Resistor 97 is in turn connected to the conductor 93. A fixed resistor 101 is connected by means of a conductor 102 to the conductor 92 and thus to the secondary 38 of transformer 35. This resistor is in turn connected by means of a conductor 103 to an adjustable resistor 104. Resistor 104 is connected by means of a conductor 105 to another fixed resistor 106. This resistor in turn is connected by means of a conductor 107 to an adjustable resistor 108 which in turn is connected by means of a conductor 109 to the conductor 95 and thus to the conductor 62 of rectifier 60. A condenser 109 is connected by means of a conductor 111 to the conductor 44 and by means of a conductor 112 to the conductor 105.

The two circuits 70 and 80 of the sensing device D produce voltages of opposite polarity which are superimposed to produce a single D.C. output from the sensing device by means of the output circuit 40 of the device. This circuit is constructed as follows: The conductor 55 of rectifier 50 and the conductor 63 of the rectifier 60 are connected together by means of a conductor 113. This conductor is in turn connected by means of a conductor 114 to the movable contact 115 of a variable resistor or potentiometer 116. One end of the said resistor is connected by means of a conductor 117 to a resistor 118 which in turn is connected by means of a conductor 119 to a choke 122. Choke 122 is connected by means of a conductor 123 to the conductor 53 of the rectifier 50. The other end of the resistor 116 is connected to a resistor 123 by means of a conductor 124 which resistor in turn is connected by means of a conductor 125 to a choke 126. Choke 126 is connected by means of a conductor 127 to the conductor 65 of rectifier 60. A condenser 128 is connected by means of a conductor 129 to conductor 114 and is further connected by means of a conductor 131 to conductor 119. Similarly, a condenser 132 is connected by means of a conductor 133 to conductor 114 and by means of a conductor 134 to the conductor 125. The output of the sensing circuit D is taken from a line 130 which comprises two conductors 135 and 136 which are connected to the conductors 119 and 125 respectively.

The power supply H comprises a transformer 137 which has a primary winding 138 and a secondary winding 139. The winding 138 is connected to a line 141 which is energized from a source of 120 volt alternating current. The secondary 139 is connected to a bridge rectifier 142 by means of conductors 143 and 144. The rectifier 142 has output conductors 145 and 146. The conductor 145 is connected to a choke 147 which in turn is connected by means of a conductor 148 to a resistor 149. This resistor is directly connected to the conductor 136. Connected to the conductor 145 and to the conductor 146 is a condenser 151 and similarly connected to the conductor 148 and conductor 146 is a condenser 180. A Zener diode 159 forming part of the power supply H is connected to the conductor 146 and also to the conductor 135 by means of conductors 71 and 72. Choke 149 and condensers 151 and 180 form a filter which irons out the ripples in the current and provide a direct voltage of approximately 18 volts which supplies the collector and bias voltage for the control circuit and the transistor amplifier circuit as well as voltage for the magnetic amplifier.

The control circuit E utilizes a transistor 152 which has an emitter 153, a base 154 and a collector 155. The emitter 153 is connected by means of a conductor 156 to a conductor 245 which in turn is connected to the conductor 136. The collector 155 is connected by means of a conductor 157 to the amplifier F. A resistor 158 is connected to the conductor 157 and also to the conductor 146 by means of conductors 161 and 162. The base 154 of the transistor 152 is connected by means of a conductor 241 to a bias limiting resistor 242. This resistor is in turn connected by a conductor 243 to a bias adjusting resistor 244. This resistor is in turn connected to the conductor 156 leading from the emitter 153 of the transistor 152 by means of a conductor 245.

Transistor 152 is mounted within an oven 160 including a case 163 best shown in detail in Fig. 2. This case has a base 164 which is provided with prongs, not shown, and which are adapted to enter into a socket 165. Socket 165 has connected to it a base 166 which has prongs 167 and which may be connected to a standard octal socket not shown. The case 163 is enclosed by a tubular member 168 which fits over the socket 165 and is frictionally held in position thereon. On this tubular member is wound a winding 169 which serves as a heater for heating the member 168 and the transistor 152. A housing 150 applied to the base 166 encloses the entire contents of the oven 160. The winding 169 is connected at one end to one side 171 of a power line 170 while the other end of said winding is connected to a thermostatic switch 173 by means of a conductor 174. Switch 173 in turn is connected to the other side 172 of line 170. The thermostatic switch 173 is set to produce a temperature of 55° centigrade at the transistor.

The transistor amplifier F consists of a transistor 175 which has an emitter 176, a base 177 and a collector 178. The emitter 176 is connected by means of a conductor 179 to a resistor 181 which in turn is connected by a conductor 182 to the conductor 135. The base 177 of said transistor is connected to the conductor 157 previously referred to. Collector 178 is connected by means of a conductor 184 to a condenser 185 which in turn is connected by a conductor 186 to the conductor 146. The resistor 181 is connected to another resistor 187 by means of a conductor 188 and to which the conductor 179 is connected and forms a voltage divider for providing bias voltage for the transistor 175. The resistor 187 is further connected by means of a conductor 189 to the conductor 146. A condenser 191 is connected across the conductors 188 and 184.

The magnetic amplifier G consists of two saturable core reactors 192 and 193 which have control windings 194 and 195 and power windings 196 and 197. The control windings 194 and 195 are connected together by means of a conductor 198 and the winding 194 is connected by means of a conductor 199 to the conductor 146. The winding 195 is connected by a conductor 201 to a choke 202 which in turn is connected by conductor 203 to a resistor 204. Resistor 204 is connected by means of a conductor 205 to the conductor 184. The power windings 196 and 197 are connected together by means of a conductor 206. This conductor is connected to another conductor 207 which in turn is connected to one side of the line 141. The magnetic amplifier in addition to the reactors 192 and 193 includes four rectifiers 211, 212, 213 and 214. These rectifiers are connected in series by means of conductors 215, 216 and 217. Rectifier 211 is connected by means of a conductor 218 to the power winding 196 of reactor 192 while the rectifier 214 is connected by means of a conductor 219 to the winding 197 of the reactor 193. Conductor 216 is connected by means of a conductor 221 to the other slide of the line 141. The output from the magnetic amplifier is taken through two conductors 222 and 223 connected to conductors 215 and 217.

To stabilize the output of the invention the stabilizer I is employed. This stabilizer comprises a damping device 220 and an anticipating circuit 230 forming part of the control circuit E. The damping device 220 includes a transformer 224 having a primary winding 226 and a secondary winding 225. The primary winding 226 of the transformer 224 is connected by means of a conductor 227 to a resistor 228 which in turn is connected by a conductor 229 to one side of the winding 24 of the slip coupling B. The conductor 222 of the magnetic amplifier is connected to the conductor 215. A resistor 231 is connected across the conductors 222 and 223.

The anticipating circuit 230 includes a resistor 232 connected to a condenser 233 by means of a conductor 234. Resistor 232 is connected by means of a conductor 235 with one side of the secondary winding 225 of transformer 224. The other side of the condenser 233 is connected by means of a conductor 236 to the other side of the secondary winding 225 of said transformer. An adjustable damping control resistor 237 is connected across the terminals of the secondary winding 225 of transformer 224. Another condenser 238 is connected by means of conductors 239 and 240 to the conductors 236 and 245. A resistor 259 is employed which is connected to the two conductors 241 and 234. Resistor 259 together with resistor 232 forms a control resistance for the control circuit E.

A gain control 250 is provided which includes a limiting resistor 251 and an adjustable resistor 252 connected in series by means of a conductor 253. The adjustable arm of resistor 252 is connected by a conductor 254 to conductor 236 while the other end of the resistor 252 is directly connected to conductor 136.

The following description and values of components have been found to be suitable for use in the system to maintain a constant frequency of a sixty cycle 9.4 kva., 120 volts, single phase alternating current 60 cycle generator operating at a speed of 1800 r.p.m.:

| | Ohms | Watts |
|---|---|---|
| Resistor: | | |
| 81 | 400 | 50 |
| 86 | 400 | 20 |
| 75 | 150 | 20 |
| 101 | 500 | 50 |
| 106 | 500 | 20 |
| 96 | 200 | 20 |
| 118 | 300 | 5 |
| 123 | 300 | 5 |
| 84 | 150 | 50 |
| 87 | 150 | 50 |
| 76 | 100 | 50 |
| 104 | 200 | 50 |
| 108 | 200 | 50 |
| 97 | 150 | 50 |
| Multiturn Potentiometer | 200 | 5 |

| Capacitors: | |
|---|---|
| 46 | |
| 48 | |
| 91 | 5.0 mfd. |
| 94 | |
| 66 | |
| 109 | 10 mfd. |
| 128 | |
| 132 | 100 mfd. |
| Choke: | |
| 122 | |
| 126 | 5 to 10 henries |
| Transformer 35 | 120 v./80 v./80v. |

| | Ohms | Watts |
|---|---|---|
| Resistor: | | |
| 149 | 125 | 10 |
| 242 | 2,000 | 3 |
| 231 | 2,000 | 3 |
| 232 | 5,000 | 3 |
| 158 | 7,000 | 3 |
| 187 | 300 | 5 |
| 181 | 20 | 3 |
| 204 | 500 | 5 |
| 231 | 500 | 25 |
| 229 | 25 | 200 |
| 251 | 2,000 | 3 |
| Rheostat: | | |
| 237 | 200 | ¼ |
| 244 | 10,000 | ¼ |
| Potentiometer 252 | 10,000 | ¼ |

| Capacitor: | | |
|---|---|---|
| 152 | mfd | 6 |
| 151 | mfd | 6 |
| 185 | mfd | 2 |
| 191 | mfd | 2 |
| 233 | mfd | 40 |
| 238 | mfd | 20 |
| Filter choke: | | |
| 147 | hy | 5–10 |
| 204 | hy | 5–10 |
| Transformer 137 | v | 120/42 |
| Rectifier 142 | | 4–1N91 |
| Rectifier: | | |
| 211 | | |
| 212 | | 4JA411BM1AD1 |
| 213 | | |
| 214 | | |
| Zener diode 159 | v | 19 |
| Transistor: | | |
| 152 | | 2N525 |
| 175 | | 2N540 |

The method of operation of the invention is as follows: When the output of the generator A varies in frequency, the current fed to the sensing device D through conductors 41 and 42 is divided into two parts by transformer 35 flowing into the two tuned circuits 70 and 80. Each of these circuits is a tuned circuit of the parallel T type, resistors 81, 84, 86, 88, 76 and 75 and condensers 46, 48 and 66 forming the tuning components of circuit 70, and resistors 101, 104, 106, 108, 97 and 96 and condensers 91, 94 and 109 forming the tuning components of circuit 80, the circuit 70 being tuned to a frequency higher than the desired frequency and the circuit 80 being tuned to a frequency lower than the desired frequency. Where the desired frequency is 60 cycles per second the circuit 70 with the values of the components specified would be about 72 cycles and about 48 cycles for the circuit 80. The currents produced by the two circuits are rectified by the rectifiers 50 and 60. As is well known with this type of tuned circuits, the voltage output is minimum at the tuned frequency and increases as the frequency departs from the tuned frequency. The relation of the output voltage of the two circuits 70 and 80 to the frequency is illustrated by the two curves 260 and 261 in Fig. 3. Due to the fact that the diodes in the two rectifiers 50 and 60 are reversed, the output voltage of circuit 70 is positive and the output voltage of circuit 80 is negative. It will be noted that the minimum voltage at vertex 255 in curve 260 comes at 48 cycles per second and that the vertex 256 of curve 261 comes at 72 cycles. The current from the two circuits 70 and 80 are combined by the output section 40 of the sensing device and produce a resultant output current for the device whose D.C. voltage varies with respect to the frequency as shown by the curve 262 in Fig. 4. Where the ordinates of the curves 260 and 261 in Fig. 3 are equal as indicated by the dotted line 257 and of opposite polarity the resultant voltage is zero as indicated at 258 in Fig. 4. With the tuned frequencies of the sections 70 and 80 being 72 and 48 cycles per second, zero voltage occurs at 60 cycles so that a variance of the frequency of the voltage of the generator being regulated produces a decided change in the value of the sensing device output voltage.

Figure 4:
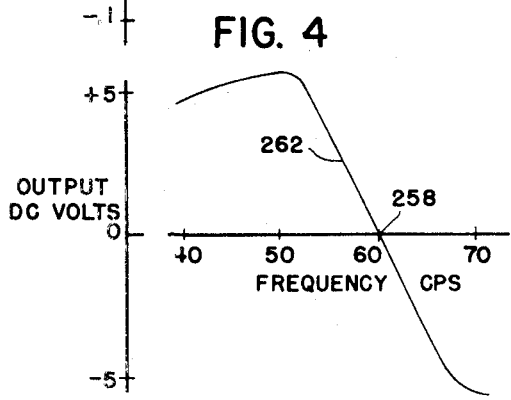
Fig. 4 is a diagrammatic view of a curve designating the resulting output voltage of the sensing device.
Figure 6:
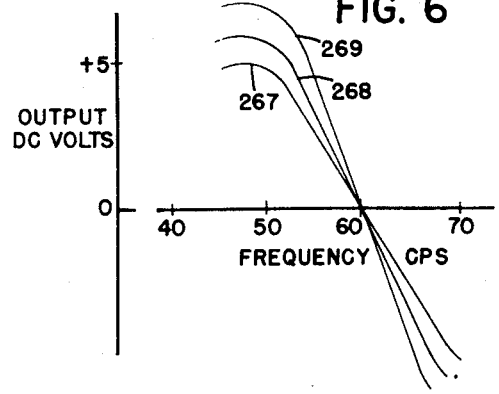
Fig. 6 is a diagrammatic view of the output voltage of the sensing circuit showing variations in input voltage.

Whereas a variance of generator frequency applied to the sensing device produces a direct voltage output as shown by the curve of Fig. 4. A variance of generator voltage modifies the curve as shown in Fig. 6, where curve 268 is a characteristic at normal generator voltage, curve 267 being at 10 percent below normal generator voltage, and curve 269 at 10 percent above normal generator voltage. It will be noted that the curves cross each other at zero output volts. The frequency of the cross-over point can be varied by changing the tuned circuit components but the output voltage at the cross-over point will always be zero. At, or nearly at, zero output voltage is then the most desirable operating point to make the frequency sensing as free as possible from input voltage variation.

Figure 7:
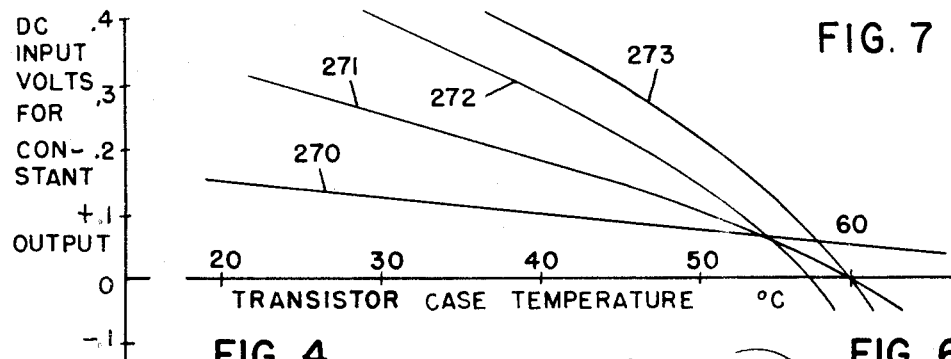
Fig. 7 is a diagrammatic view of curves showing the operation of the control circuit.

The current from the sensing device D is fed to the control circuit E where it energizes transistor 152. It is well known that the collector current operating point of a transistor varies with the temperature of the transistor, the higher the temperature the lower the base to emitter voltage to maintain a constant collector current. This is illustrated in Fig. 7 where the well known effect of transistor temperature on the emitter-to-base voltage with collector current constant and where resistors 259 and 232 are zero, is shown by curve 270. The effect of temperature on the input voltage to the control circuit composed chiefly of resistors 232, 259, 242 and 244 and the transistor 152 is shown by curves 271 and 272. The curves depart from the 270 path to the 271 path with increasing resistance of 232 and 259 and to the 272 path with further increasing resistance of 232 and 259. Still further shifting of the curves toward path 273 is accomplished by decreasing resistance of 242 and 244.

While a low temperature, for example room temperature, might be desirable, the voltage required would be rather high because the required circuit resistances place the operating point on a curve such as 272 of Fig. 7. This would require a high output voltage from the sensing circuit which would then be adversely affected by generator voltage changes as pointed out previously. For this reason, the oven 160 is employed to maintain the transistor 152 at a temperature permitting an input voltage near zero.

Figure 5:
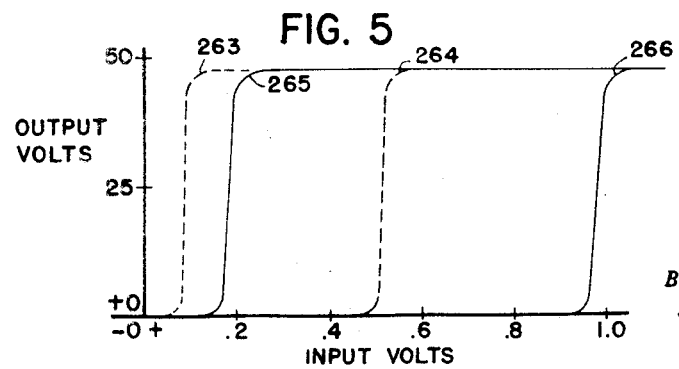
Fig. 5 is a diagrammatic view of curves designating the output voltage from the amplifiers for different temperatures and gains.

Various curves 263, 264, 265 and 266 are shown in Fig. 5 which indicate the relation between the input and output of the D.C. amplifier, the input across gain control 252 and resistor 251 and the output across conductors 222 and 229. Curves 263 and 265 are typical for an oven temperature of 55° centigrade while curves 264 and 266 are for an oven temperature of 25° centigrade. Curves 263 and 264 are for one hundred percent gain while curves 265 and 266 are for fifty percent gain. It has been found desirable to operate at about 55° temperature for germanium transistors at which less than two-tenths of a volt is necessary to bring about the desired results which is close enough to the most desirable zero output voltage operating point of the sensing circuit.

The output of the transistor 152 is fed to the amplifier F comprising transistor 175 which amplifies the control current and which feeds the same to the magnetic amplifier G. This amplifier further amplifies the control current and provides sufficient capacity to operate the slip coupling B.

To prevent hunting in the system the stabilizing system I is employed. Gain control is had by the variable resistor 252 while control of the selected frequency is had by means of the variable resistor or potentiometer 116.

The advantages of the invention are manifest. The system will maintain the frequency of a generator constant to within one-tenth of one percent. The system operates quite rapidly in response to variations in frequency giving practically instantaneous adjustment. After an initial warm up period, the frequency remains continuously constant as compared with systems in which the average frequency over an extended period is made constant by adjustment at the end of the period. The system operates independently of line voltage, load, motor speed, and variations in temperature both ambient and equipment produced. The system may be used with both large and small generators.

Changes in the specific form of the invention, as herein described, may be made within the scope of what is claimed without departing from the spirit of the invention.

Having described the invention, what is claimed as new and desired to be protected by Letters Patent is:

1. In a constant-frequency electrical system having a generator whose frequency is to be regulated, an electromagnetic slip coupling driving said generator and having a winding, a prime mover driving said slip coupling, a sensing device sensitive to variations in frequency and actuated by the output from the generator to produce a voltage varying with the departure of the frequency from a selected frequency, the combination of a transistor having an input circuit and an output circuit, said sensing device being connected to said input circuit, amplifying means connected to said output circuit and to the winding of said slip coupling, and an oven in which said transistor is disposed and causing said transistor to operate at substantially zero input voltage at the selected frequency.

2. In a constant-frequency electrical system having a generator whose frequency is to be regulated, an electromagnetic slip coupling driving said generator and having a winding, a prime mover driving said slip coupling, a sensing device sensitive to variations in frequency and actuated by the output from the generator to produce a voltage varying with the departure of the frequency from a selected frequency, the combination of a transistor having a base, an emitter and a collector, an input circuit connected to said base and an output circuit connected to said collector, said emitter being common to both of said circuits, said sensing device being connected to said input circuit, amplifying means connected to said output circuit and to the winding of said slip coupling, and an oven in which said transistor is disposed and causing said transistor to operate at substantially zero input voltage at the selected frequency.

3. In a constant-frequency electrical system having a generator whose frequency is to be regulated, an electromagnetic slip coupling driving said generator and having a winding, a prime mover driving said slip coupling, a sensing device sensitive to variations in frequency and actuated by the output from the generator to produce a voltage varying with the departure of the frequency from a selected frequency, the combination of a transistor having a base, an emitter and a collector, an input circuit connected to said base and an output circuit connected to said collector, said emitter being common to both of said circuits, said sensing device being connected to said input circuit, an amplifier including a second transistor having a base, an emitter and a collector, the output circuit of said first transistor serving as the input circuit for the second transistor and connected to the base thereof, a magnetic amplifier, an input circuit therefor connected to the collector of said second transistor, the emitter of said second transistor being common to both of the circuits connected thereto, an output circuit for said magnetic amplifier connected to the winding of said slip coupling, and an oven in which said transistor is disposed and causing said transistor to operate at substantially zero input voltage at the selected frequency.

4. In a constant-frequency electrical system having a generator whose frequency is to be regulated, an electromagnetic slip coupling driving said generator and having a winding, a prime mover driving said slip coupling, a sensing device sensitive to variations in frequency and actuated by the output from the generator to produce a voltage varying with the departure of the frequency from a selected frequency, the combination of a germanium transistor having a base, an emitter and a collector, an input circuit connected to said base and an output circuit connected to said collector, said emitter being common to both of said circuits, said sensing device being connected to said input circuit, amplifying means connected to said output circuit and to the winding of said slip coupling, and an oven in which said transistor is disposed and causing said transistor to operate at substantially zero input voltage at the selected frequency, said oven being heated sufficiently to maintain said transistor at a temperature of substantially 55 degrees centigrade.

5. In a constant-frequency electrical system having a generator whose frequency is to be regulated, an electromagnetic slip coupling driving said generator and having a winding, a prime mover driving said slip coupling, a sensing device sensitive to variations in frequency and actuated by the output from the generator to produce a voltage varying with the departure of the frequency from a selected frequency, the combination of a transistor having a base, an emitter and a collector, an input circuit connected to said base and an output circuit connected to said collector, said emitter being common to both of said circuits, said sensing device being connected to said input circuit, a control resistance connected in said input circuit, amplifying means connected to said output circuit and to the winding of said slip coupling, and an oven in which said transistor is disposed and causing said transistor to operate at substantially zero input voltage at the selected frequency.

6. In a constant-frequency electrical system having a generator whose frequency is to be regulated, an electromagnetic slip coupling driving said generator and having a winding, a prime mover driving said slip coupling, a sensing device sensitive to variations in frequency and actuated by the output from the generator to produce a voltage varying with the departure of the frequency from a selected frequency, the combination of a transistor having a base, an emitter and a collector, an input circuit connected to said base and an output circuit connected to said collector, said emitter being common to both of said circuits, said sensing device being connected to said input circuit, control resistance comprising a resistor connected in series in said input circuit, amplifying means connected to said output circuit and to the winding of said slip coupling, and an oven in which said transistor is disposed and causing said transistor to operate at substantially zero input voltage at the selected frequency.

7. In a constant-frequency electrical system having a generator whose frequency is to be regulated, an electromagnetic slip coupling driving said generator and having a winding, a prime mover driving said slip coupling, a sensing device sensitive to variations in frequency and actuated by the output from the generator to produce a voltage varying with the departure of the frequency from a selected frequency, the combination of a transistor having a base, an emitter and a collector, an input circuit connected to said base and an output circuit connected to said collector, said emitter being common to both of said circuits, said sensing device being connected to said input circuit, control resistance comprising a resistor connected in series in said input circuit and a resistor connected across said base and emitter, amplifying means connected to said output circuit and to the winding of said slip coupling, and an oven in which said transistor is disposed and causing said transistor to operate at substantially zero input voltage at the selected frequency.

No references cited.